United States Patent
Hanzawa

(10) Patent No.: US 10,171,761 B2
(45) Date of Patent: Jan. 1, 2019

(54) SOLID-STATE IMAGING DEVICE AND ELECTRONIC DEVICE

(71) Applicant: SONY CORPORATION, Tokyo (JP)

(72) Inventor: Katsuhiko Hanzawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/560,645

(22) PCT Filed: Mar. 18, 2016

(86) PCT No.: PCT/JP2016/058649
§ 371 (c)(1),
(2) Date: Sep. 22, 2017

(87) PCT Pub. No.: WO2016/158484
PCT Pub. Date: Oct. 6, 2016

(65) Prior Publication Data
US 2018/0098005 A1    Apr. 5, 2018

(30) Foreign Application Priority Data

Apr. 3, 2015 (JP) ................................ 2015-076732

(51) Int. Cl.
*H04N 3/14* (2006.01)
*H04N 5/335* (2011.01)
(Continued)

(52) U.S. Cl.
CPC ............ *H04N 5/359* (2013.01); *H04N 5/374* (2013.01); *H04N 5/378* (2013.01); *H04N 5/37455* (2013.01); *H04N 5/37457* (2013.01)

(58) Field of Classification Search
CPC ........................ H04N 5/37455; H04N 5/378
(Continued)

(56) References Cited

U.S. PATENT DOCUMENTS 7,741,593 B2 *   6/2010  Iwata ................. H04N 5/378
                                                    250/208.1
2006/0278809 A1  12/2006  Takayanagi
2009/0200449 A1   8/2009  Iwata et al.

FOREIGN PATENT DOCUMENTS

CN    101243681 A    8/2008
CN    101510963 A    8/2009
(Continued)

OTHER PUBLICATIONS

International Search Report and Written Opinion of PCT Application No. PCT/JP2016/058649, dated May 24, 2016, 12 pages of ISRWO.

*Primary Examiner* — Michael Lee
*Assistant Examiner* — Jean W Desir
(74) *Attorney, Agent, or Firm* — Wolf, Greenfield & Sacks, P.C.

(57) ABSTRACT

The present technology relates to a solid-state imaging device and an electronic device that enable a reduction in the voltage of an AD conversion circuit. A solid-state imaging device includes: a plurality of pixels; a vertical signal line configured to output a pixel signal of the pixel; and a clipping circuit configured to limit a voltage of the vertical signal line to a predetermined voltage. The clipping circuit includes a transistor configured to generate the predetermined voltage in accordance with a voltage of a gate, and a sample holding circuit configured to hold a reset level of the pixel that is output to the vertical signal line, and input the reset level to the gate of the transistor. The present technology can be applied to a CMOS image sensor, for example.

4 Claims, 20 Drawing Sheets

(51) Int. Cl.
    *H04N 5/359*     (2011.01)
    *H04N 5/374*     (2011.01)
    *H04N 5/378*     (2011.01)
    *H04N 5/3745*     (2011.01)

(58) Field of Classification Search
    USPC ..... 348/572, 308, 310, 294; 250/206, 208.1, 250/214 R
    See application file for complete search history.

(56) References Cited

FOREIGN PATENT DOCUMENTS

| | | |
|---|---|---|
| JP | 2006-352341 A | 12/2006 |
| JP | 2008-042676 A | 2/2008 |
| JP | 2008-544656 A | 12/2008 |
| JP | 2009-194569 A | 8/2009 |
| JP | 2012-085343 A | 4/2012 |
| KR | 10-2008-0019292 A | 3/2008 |
| KR | 10-1069524 B1 | 9/2011 |
| WO | 2006/138533 A1 | 12/2006 |

\* cited by examiner

SOLID-STATE IMAGING DEVICE AND ELECTRONIC DEVICE

CROSS REFERENCE TO RELATED APPLICATIONS

This application is a U.S. National Phase of International Patent Application No. PCT/JP2016/058649 filed on Mar. 18, 2016, which claims priority benefit of Japanese Patent Application No. JP 2015-076732 filed in the Japan Patent Office on Apr. 3, 2015. Each of the above-referenced applications is hereby incorporated herein by reference in its entirety.

TECHNICAL FIELD

The present technology relates to a solid-state imaging device and an electronic device, and particularly relates to a solid-state imaging device and an electronic device that enable a reduction in the voltage of an AD conversion circuit.

BACKGROUND ART

Recent years have seen the widespread use of cameras using CMOS image sensors (solid-state imaging devices).

In the case where such an image sensor is irradiated with high-intensity light, a phenomenon occurs in which a portion that originally is to be bright in an image becomes black. The black portion in the image is also called a sunspot etc., because it looks like a sunspot. The sunspot is caused by fluctuation of a reset level, which occurs when a large amount of charge generated in a photodiode (PD) constituting a pixel leaks to a floating diffusion (FD) or the FD is directly exposed to light.

To correct such a sunspot, limiting the voltage of a vertical signal line so that the reset level does not fluctuate beyond a certain level has been proposed.

For example, Patent Literature 1 describes that a clipping circuit limits the potential of a vertical signal line to different potentials between in reset level reading and in signal level reading.

CITATION LIST

Patent Literature

Patent Literature 1: JP 2012-85343A

DISCLOSURE OF INVENTION

Technical Problem

However, in the case where there is variation (mainly variation in threshold voltage) between amplification transistors of pixels, the reset level of a pixel fluctuates. Therefore, the gate voltage of the clipping circuit needs to be set to include some margin, in consideration of this variation. Accordingly, also a dynamic range of an AD conversion circuit needs to be set to include a margin similarly. That is, it is necessary to design the AD conversion circuit in consideration of at least a voltage corresponding to this margin, which hinders a reduction in the voltage of the AD conversion circuit.

The present technology has been made in view of such circumstances, and enables a reduction in the voltage of an AD conversion circuit.

Solution to Problem

A solid-state imaging device of an aspect of the present technology includes: a plurality of pixels; a vertical signal line configured to output a pixel signal of the pixel; and a clipping circuit configured to limit a voltage of the vertical signal line to a predetermined voltage. The clipping circuit includes a transistor configured to generate the predetermined voltage in accordance with a voltage of a gate, and a sample holding circuit configured to hold a reset level of the pixel that is output to the vertical signal line, and input the reset level to the gate of the transistor.

The clipping circuit can further include a capacitor having one electrode connected to the gate of the transistor, and a voltage generation circuit configured to generate a plurality of different voltages can be connected to the other electrode of the capacitor.

The voltage generation circuit can apply different voltages to the capacitor between in reading the reset level of the pixel and in reading a signal level of the pixel.

The clipping circuit can include a plurality of the capacitors, and the voltage generation circuit can apply a first voltage to one capacitor in reading the reset level of the pixel, and apply a second voltage to another capacitor in reading a signal level of the pixel.

The clipping circuit can further include a selector configured to turn on/off a limitation on the voltage of the vertical signal line using the predetermined voltage generated by the transistor.

An electronic device of an aspect of the present technology includes a solid-state imaging device including a plurality of pixels, a vertical signal line configured to output a pixel signal of the pixel, and a clipping circuit configured to limit a voltage of the vertical signal line to a predetermined voltage. The clipping circuit includes a transistor configured to generate the predetermined voltage in accordance with a voltage of a gate, and a sample holding circuit configured to hold a reset level of the pixel that is output to the vertical signal line, and input the reset level to the gate of the transistor.

In an aspect of the present technology, the predetermined voltage is generated in accordance with the voltage of the gate, and the reset level of the pixel that is output to the vertical signal line is held and input to the gate of the transistor.

Advantageous Effects of Invention

According to an aspect of the present technology, the voltage of an AD conversion circuit can be reduced.

MODE(S) FOR CARRYING OUT THE INVENTION

Embodiments of the present technology are described below with reference to the drawings.

<Configuration of Solid-State Imaging Device>

Figure 1:
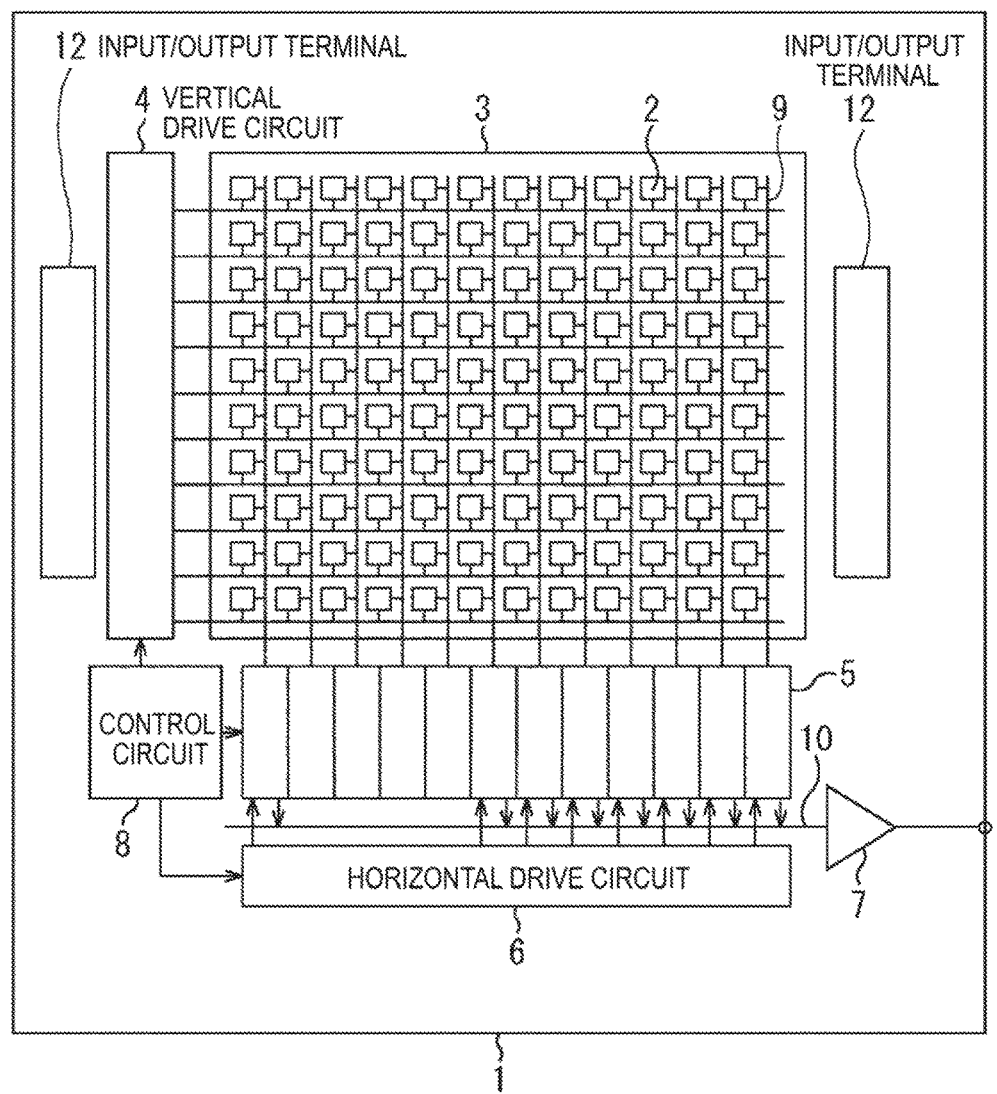
FIG. 1 is a block diagram illustrating a configuration example of a solid-state imaging device of the present technology.

FIG. 1 is a block diagram illustrating a configuration example of a solid-state imaging device of the present technology.

A solid-state imaging device 1 is configured as a complementary metal oxide semiconductor (CMOS) image sensor. The solid-state imaging device 1 includes a pixel area (pixel array) 3 in which a plurality of pixels 2 are regularly arranged in a two-dimensional array in a semiconductor substrate (e.g., a Si substrate), which is not illustrated, and a peripheral circuit unit.

The pixel 2 includes a photoelectric conversion unit (e.g., a photodiode) and a plurality of pixel transistors (MOS transistors). The plurality of pixel transistors may include, for example, three transistors of a transfer transistor, a reset transistor, and an amplification transistor. Alternatively, the plurality of pixel transistors may include four transistors including a selection transistor in addition to the three transistors.

The pixel 2 may be configured as one unit pixel, or may be in a pixel sharing structure. This pixel sharing structure is a structure in which a plurality of photodiodes share a floating diffusion and transistors other than a transfer transistor.

The peripheral circuit unit includes a vertical drive circuit 4, column signal processing circuits 5, a horizontal drive circuit 6, an output circuit 7, and a control circuit 8.

The control circuit 8 receives an input clock and data commanding an operation mode or the like, and outputs data such as internal information of the solid-state imaging device 1. In addition, on the basis of a vertical synchronizing signal, a horizontal synchronizing signal, and a master clock, the control circuit 8 generates a clock signal and a control signal that serve as a reference for the operation of the vertical drive circuit 4, the column signal processing circuits 5, the horizontal drive circuit 6, and the like. Then, the control circuit 8 inputs these signals to the vertical drive circuit 4, the column signal processing circuits 5, the horizontal drive circuit 6, and the like.

The vertical drive circuit 4 is constituted by a shift register, for example. The vertical drive circuit 4 selects a pixel drive line, and supplies a pulse for driving pixels to the selected pixel drive line to drive pixels in units of rows. That is, the vertical drive circuit 4 selectively scans the pixels 2 of the pixel area 3 sequentially in the vertical direction in units of rows. Then, the vertical drive circuit 4 supplies pixel signals based on signal charge generated in accordance with the amount of received light in the photoelectric conversion units of the respective pixels 2 to the column signal processing circuits 5 through vertical signal lines 9.

The column signal processing circuit 5 is disposed for each column of the pixels 2, for example. The column signal processing circuits 5 perform signal processing such as noise cancellation on signals output from the pixels 2 of one row, in units of pixel columns. Specifically, the column signal processing circuits 5 perform signal processing such as correlated double sampling (CDS) for cancelling fixed pattern noise peculiar to the pixel 2, signal amplification, and analog-digital (AD) conversion. In the output stage of the column signal processing circuit 5, a horizontal selection switch (not illustrated) is provided to be connected to a horizontal signal line 10.

The horizontal drive circuit 6 is constituted by a shift register, for example. The horizontal drive circuit 6 sequentially outputs a horizontal scanning pulse to select the column signal processing circuits 5 in order, and causes the column signal processing circuits 5 to output pixel signals to the horizontal signal line 10.

The output circuit 7 performs signal processing on signals sequentially supplied from the column signal processing circuits 5 through the horizontal signal line 10, and outputs the resulting signals. For example, the output circuit 7 performs only buffering in some cases, and performs black level adjustment, column variation correction, various digital signal processing, and the like in some cases.

Input/output terminals 12 exchange signals with the outside.

<Structure of Solid-State Imaging Device>

Next, a structure of a solid-state imaging device to which the present technology is applied will be described.

Figure 2:
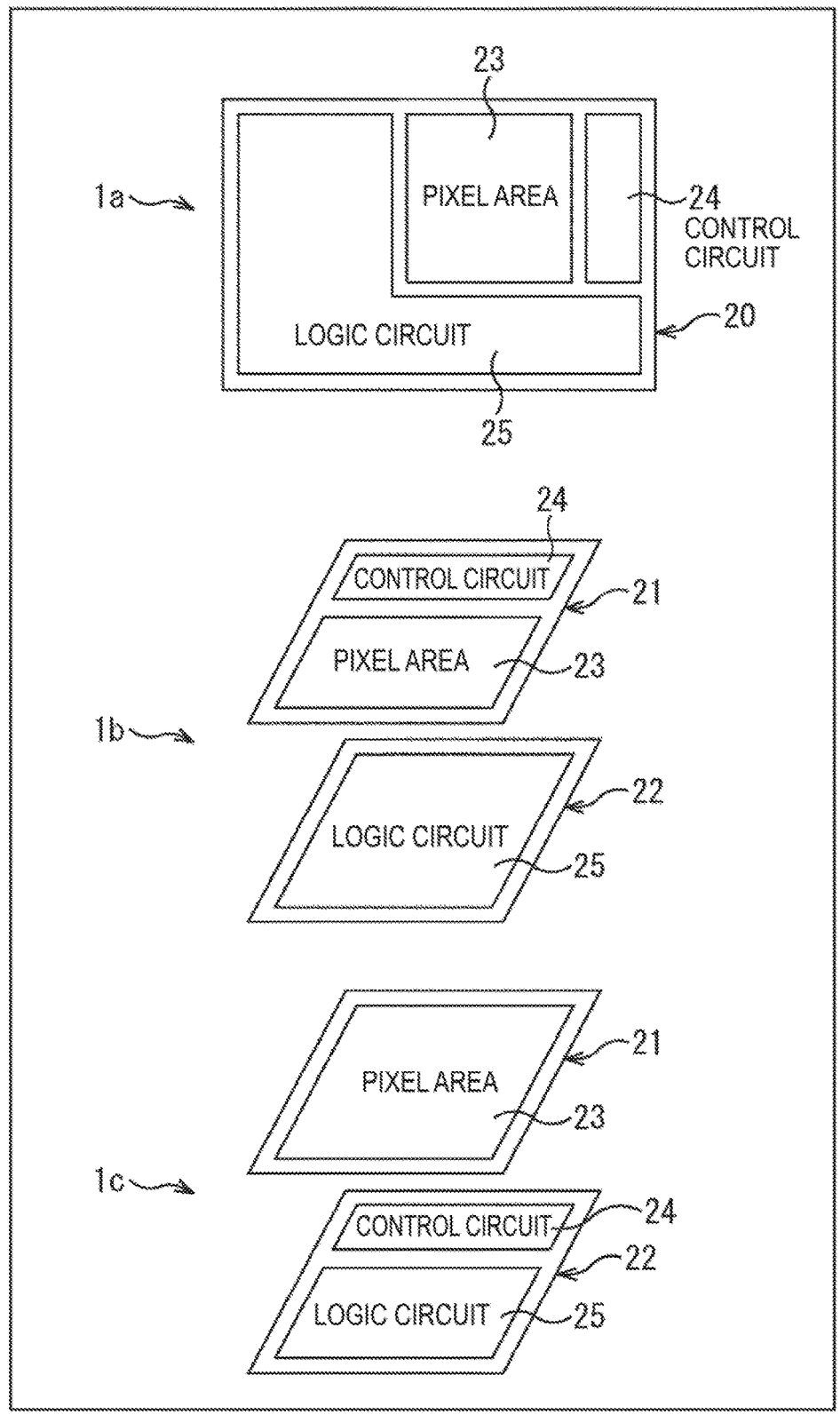
FIG. 2 is a diagram for describing a structure of a solid-state imaging device.

As a first example, a solid-state imaging device 1a illustrated in the upper stage of FIG. 2 includes a semiconductor substrate 20. The semiconductor substrate 20 is equipped with a pixel area 23, a control circuit 24, and a logic circuit 25 including a signal processing circuit. Thus, the solid-state imaging device 1a is configured as one semiconductor chip.

As a second example, a solid-state imaging device 1b illustrated in the middle stage of FIG. 2 includes a first semiconductor substrate 21 and a second semiconductor substrate 22. The first semiconductor substrate 21 is equipped with the pixel area 23 and the control circuit 24. The second semiconductor substrate 22 is equipped with the logic circuit 25 including a signal processing circuit. The first semiconductor substrate 21 and the second semiconductor substrate 22 are electrically connected to each other to constitute the stacked-type solid-state imaging device 1b serving as one semiconductor chip.

As a third example, a solid-state imaging device 1c illustrated in the lower stage of FIG. 2 includes the first semiconductor substrate 21 and the second semiconductor substrate 22. The first semiconductor substrate 21 is equipped with the pixel area 23. The second semiconductor substrate 22 is equipped with the control circuit 24 and the logic circuit 25 including a signal processing circuit. The first semiconductor substrate 21 and the second semiconductor substrate 22 are electrically connected to each other to constitute the stacked-type solid-state imaging device 1c serving as one semiconductor chip.

Note that a configuration that electrically connects the first semiconductor substrate 21 and the second semiconductor substrate 22 may be a through via, Cu—Cu metallic bonding, or other configurations.

In addition, the second semiconductor substrate 22 includes one layer in the above description, but may include two or more layers. That is, the present technology is also applicable to a solid-state imaging device made of a stack of three or more layers including the first semiconductor substrate 21 as the uppermost layer.

<Circuit Configuration and Operation of Solid-State Imaging Device>

Figure 3:
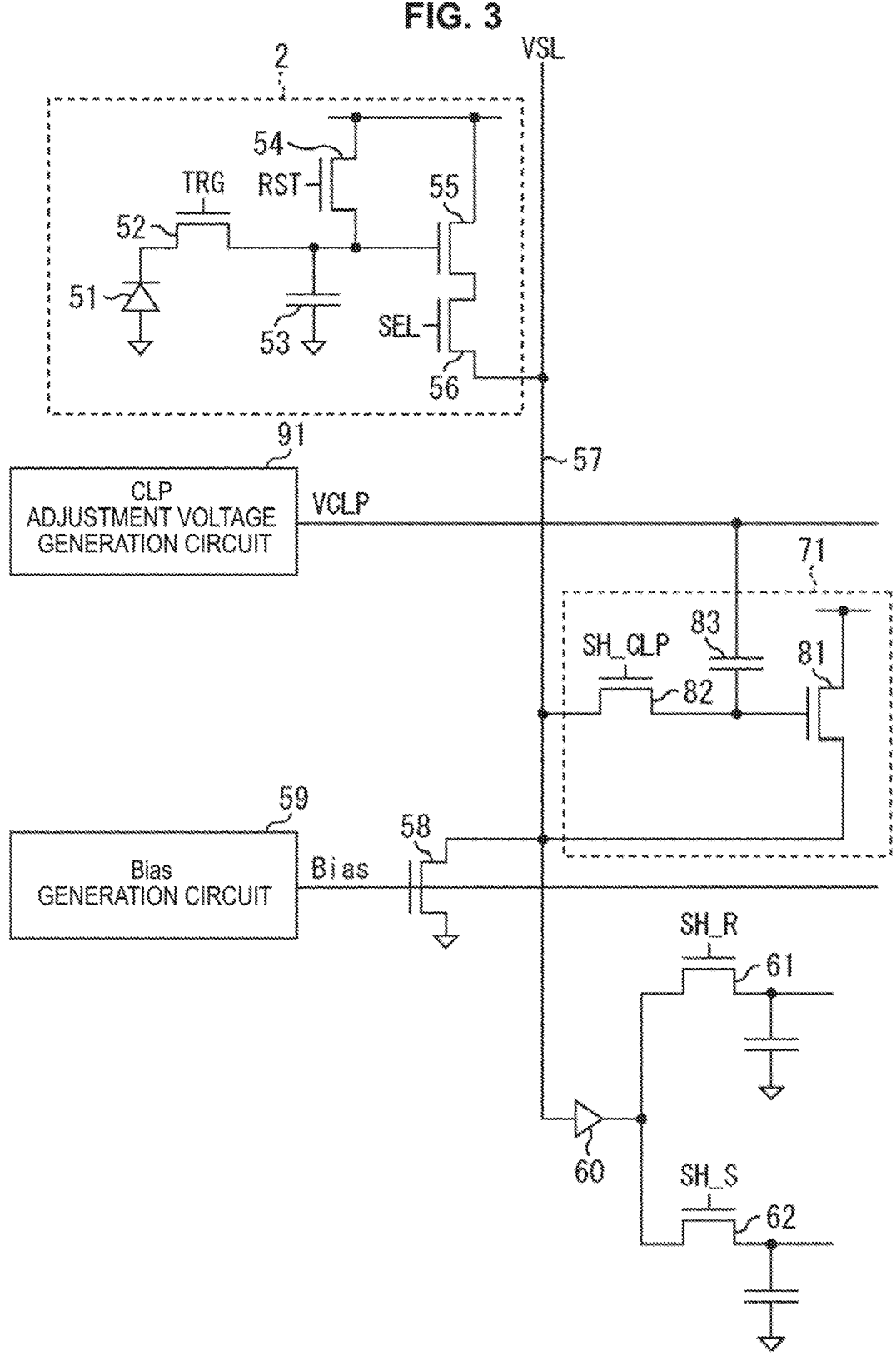
FIG. 3 illustrates a circuit configuration example of a solid-state imaging device of the present technology.

FIG. 3 illustrates a circuit configuration example of the solid-state imaging device 1 of the present technology.

As illustrated in FIG. 3, the pixel 2 includes a photodiode (PD) 51 serving as a photoelectric conversion unit, a transfer transistor 52, a floating capacitance 53, a reset transistor 54, an amplification transistor 55, and a selection transistor 56. Note that all the pixel transistors included in the pixel 2 are configured as n-channel MOS transistors.

An anode of the PD 51 is grounded, and a cathode of the PD 51 is connected to a source of the transfer transistor 52. A drain of the transfer transistor 52 is connected to a gate of the amplification transistor 55, and this connection point constitutes a floating diffusion (FD).

The reset transistor 54 is connected between a predetermined power source and the FD. A drain of the amplification transistor 55 is connected to the predetermined power source, and a source of the amplification transistor 55 is connected to a drain of the selection transistor 56. A source of the selection transistor 56 is connected to a vertical signal line 57.

In addition, the vertical signal line 57 is connected to a load MOS transistor 58. Bias voltage generated by a Bias generation circuit 59 is supplied to the load MOS transistor 58. Thus, the amplification transistor 55 and the load MOS transistor 58 constitute a source follower circuit.

The voltage of the vertical signal line 57 (a pixel signal) is read from an output terminal 60. The output of the output terminal 60 is held by a sample holding circuit 61 or a sample holding circuit 62. The sample holding circuit 61 holds the voltage (reset level) of the vertical signal line 57 corresponding to the potential of the FD when the FD is reset. The sample holding circuit 62 holds the voltage (signal level) of the vertical signal line 57 corresponding to the potential of the FD when charge of the PD 51 is transferred to the FD.

Furthermore, a clipping circuit 71 is connected to the vertical signal line 57. The clipping circuit 71 limits (clips) the voltage of the vertical signal line 57 to a predetermined voltage.

The clipping circuit 71 includes a clipping transistor 81, a sample holding circuit 82, and a capacitor 83.

The clipping transistor 81 generates a voltage to limit the voltage of the vertical signal line 57, in accordance with a clipping voltage CLP applied to its gate.

The sample holding circuit 82 holds the voltage of the vertical signal line 57, and inputs the voltage to the gate of the clipping transistor 81.

One electrode of the capacitor 83 is connected to the gate of the clipping transistor 81. The other electrode of the capacitor 83 is connected to a CLP adjustment voltage generation circuit 91.

The CLP adjustment voltage generation circuit 91 generates an adjustment voltage VCLP for adjusting the clipping voltage CLP, and applies the adjustment voltage VCLP to the capacitor 83.

Next, the operation of the solid-state imaging device illustrated in FIG. 3 will be described with reference to the timing chart of FIG. 4.

Figure 4:
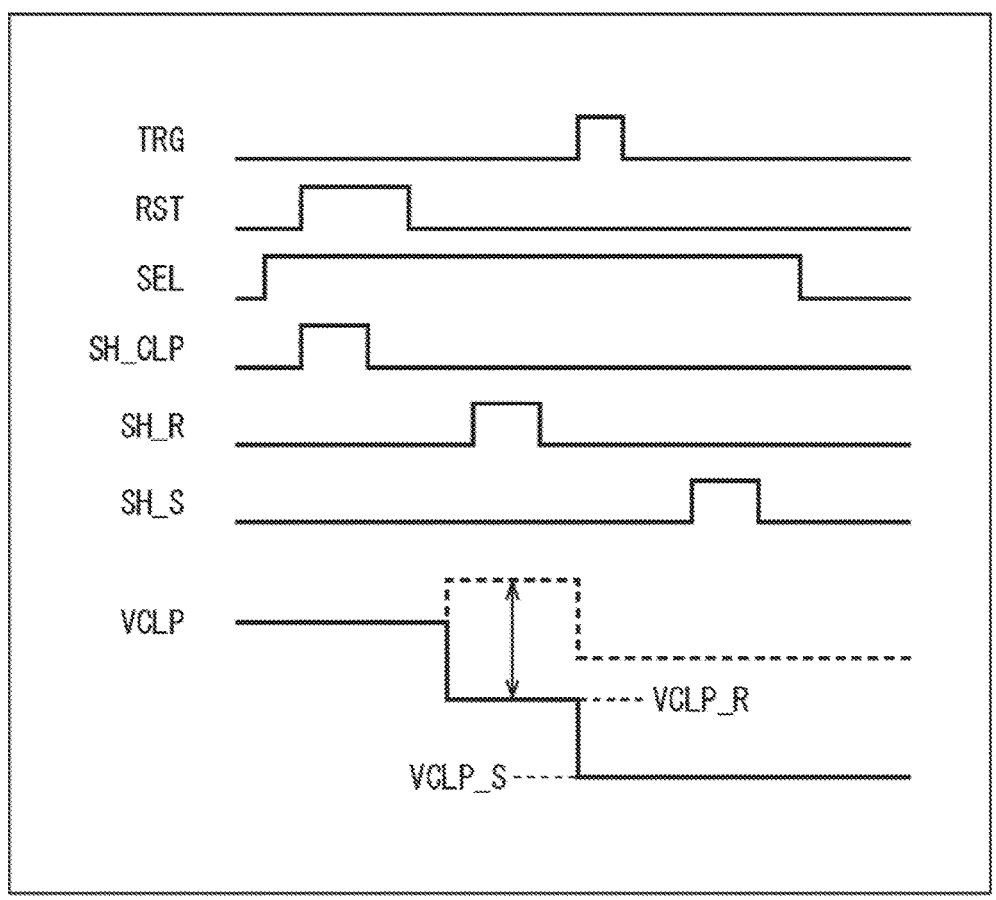
FIG. 4 is a timing chart illustrating the operation of a solid-state imaging device of the present technology.

In FIG. 4, TRG is a drive signal for driving the transfer transistor 52. RST is a drive signal for driving the reset transistor 54. SEL is a drive signal for driving the selection transistor 56. SH_CLP is a drive signal for driving the sample holding circuit 82. SH_R is a drive signal for driving the sample holding circuit 61. SH_S is a drive signal for driving the sample holding circuit 62. VCLP is an adjustment voltage for adjusting the clipping voltage CLP.

First, in a state where the drive signal SEL is high (H), when the drive signal RST rises to H, the FD of the pixel 2 is reset. At this point, the drive signal SH_CLP rises to H; thus, the voltage (reset level) of the vertical signal line 57 is held and input to the gate of the clipping transistor 81.

Then, when the drive signal SH_R rises to H, the sample holding circuit 61 holds the reset level. That is, the reset level of the pixel 2 is read.

After that, when the drive signal TRG rises to H, charge of the PD 51 is transferred to the FD of the pixel 2.

Then, when the drive signal SH_S rises to H, the sample holding circuit 62 holds the voltage (signal level) of the vertical signal line 57 corresponding to the potential of the FD when charge of the PD 51 is transferred to the FD. That is, the signal level of the pixel 2 is read.

Here, the CLP adjustment voltage generation circuit 91 applies different adjustment voltages VCLP to the capacitor 83 between in reading the reset level of the pixel 2 and in reading the signal level of the pixel 2.

Specifically, the CLP adjustment voltage generation circuit 91 applies an adjustment voltage VCLP_R to the capacitor 83 in reading the reset level of the pixel 2. Thus, the clipping voltage CLP applied to the gate of the clipping transistor 81 is adjusted, and the voltage of the vertical signal line 57 is limited to a first voltage.

In addition, the CLP adjustment voltage generation circuit 91 applies an adjustment voltage VCLP_S lower than the adjustment voltage VCLP_R to the capacitor 83 in reading the signal level of the pixel 2. Thus, the clipping voltage CLP applied to the gate of the clipping transistor 81 is adjusted, and the voltage of the vertical signal line 57 is limited to a second voltage.

Note that as indicated by the dotted line in the drawing, the adjustment voltage VCLP_R and the adjustment voltage VCLP_S can be variable in accordance with the amount of adjustment of the clipping voltage CLP. The high-low relationship between the adjustment voltage VCLP_R and the adjustment voltage VCLP_S is reversed depending on the polarity of transistors included in the pixel 2.

Such operation enables the reset level and the signal level to be clipped appropriately.

Figure 5:
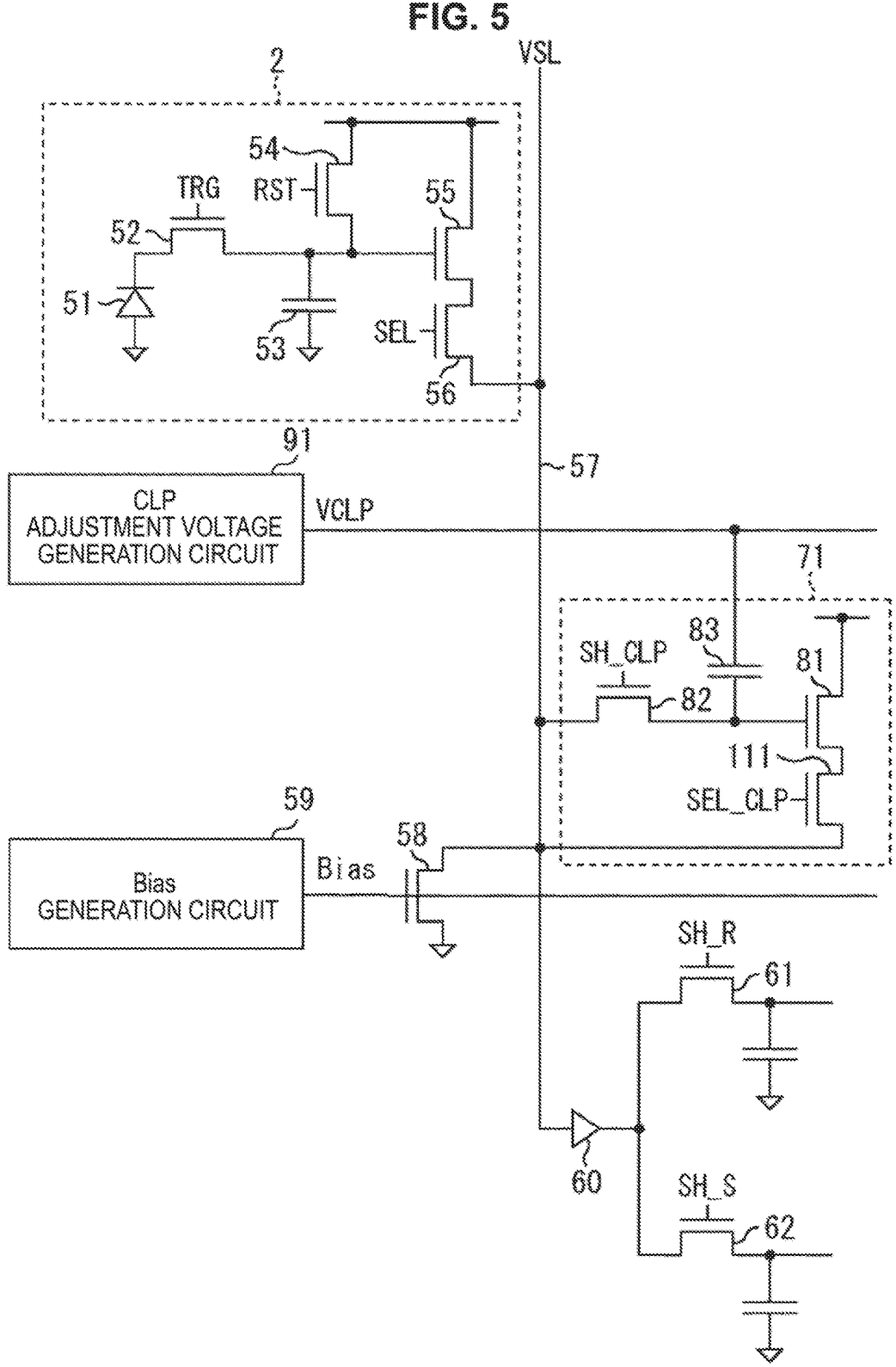
FIG. 5 illustrates a circuit configuration example of a solid-state imaging device of the present technology.

FIG. 5 illustrates another circuit configuration example of the solid-state imaging device 1 of the present technology.

The configuration in FIG. 5 is basically similar to the configuration in FIG. 3, but differs in that the clipping circuit 71 further includes a selector 111.

The selector 111 turns on/off the limitation on the voltage of the vertical signal line 57 using a voltage generated by the transistor 81.

Next, the operation of the solid-state imaging device illustrated in FIG. 5 will be described with reference to the timing chart of FIG. 6.

Figure 6:
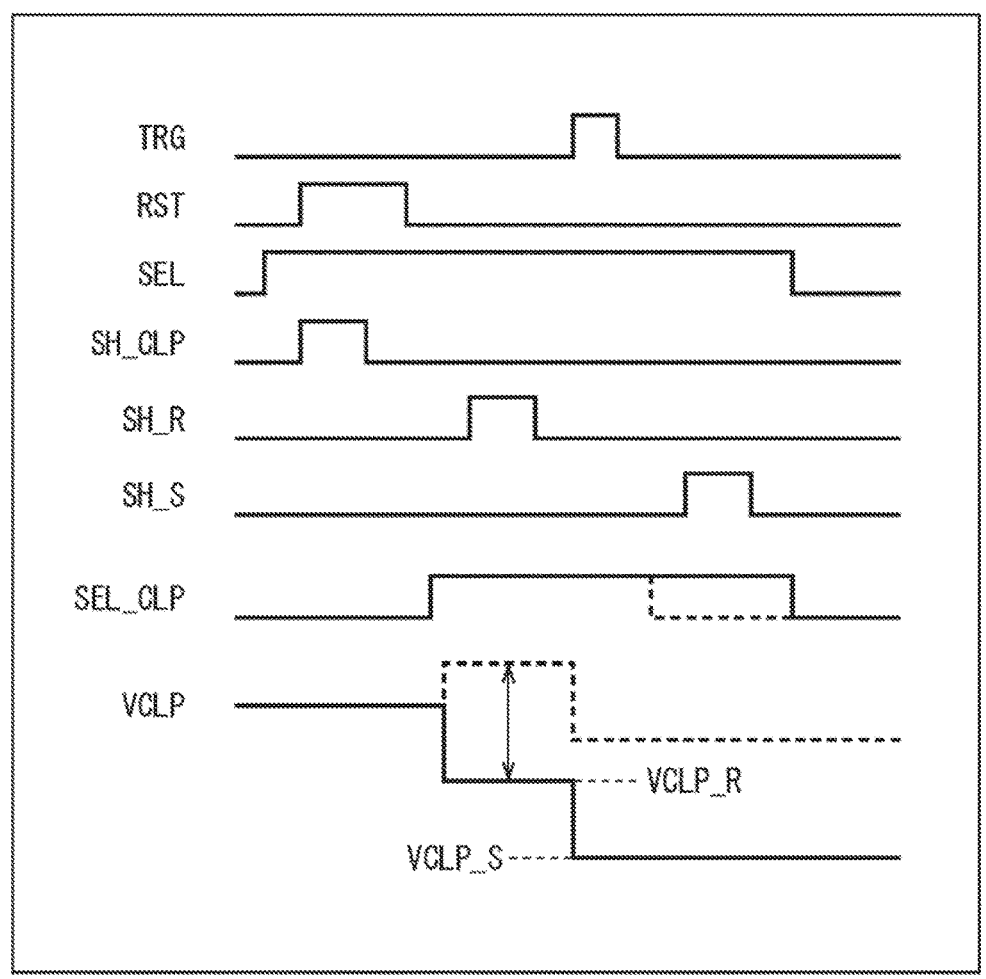
FIG. 6 is a timing chart illustrating the operation of a solid-state imaging device of the present technology.

In FIG. 6, drive signals and adjustment voltages are similar to those illustrated in FIG. 4, except for SEL_CLP. SEL_CLP is a drive signal for driving the selector 111.

As illustrated in FIG. 6, the drive signal SEL_CLP is in the H state in a period from the time of reading the reset level of the pixel 2 to the time of reading the signal level of the pixel 2. During this period, the selector 111 turns on the limitation on the voltage of the vertical signal line 57 using a voltage generated by the transistor 81.

The operation in this case is similar to the operation described with reference to FIG. 4.

Here, as indicated by the dotted line in the drawing, the drive signal SEL_CLP is in the H state only in reading the reset level of the pixel 2. During this period, the selector 111 turns on the limitation on the voltage of the vertical signal line 57 using a voltage generated by the transistor 81. In reading the signal level, the selector 111 turns off the limitation on the voltage of the vertical signal line 57 using a voltage generated by the transistor 81.

Such operation enables only the reset level to be clipped appropriately.

Note that in the operation in FIG. 6, the selector 111 may turn off the limitation on the voltage of the vertical signal line 57 using a voltage generated by the transistor 81, only in reading the signal level. Furthermore, the limitation on the voltage of the vertical signal line 57 may be turned on/off for each pixel column as necessary.

<Circuit Configuration and Operation of Conventional Solid-State Imaging Device>

Here, a circuit configuration and operation of a conventional solid-state imaging device for correcting a sunspot will be described.

Figure 7:
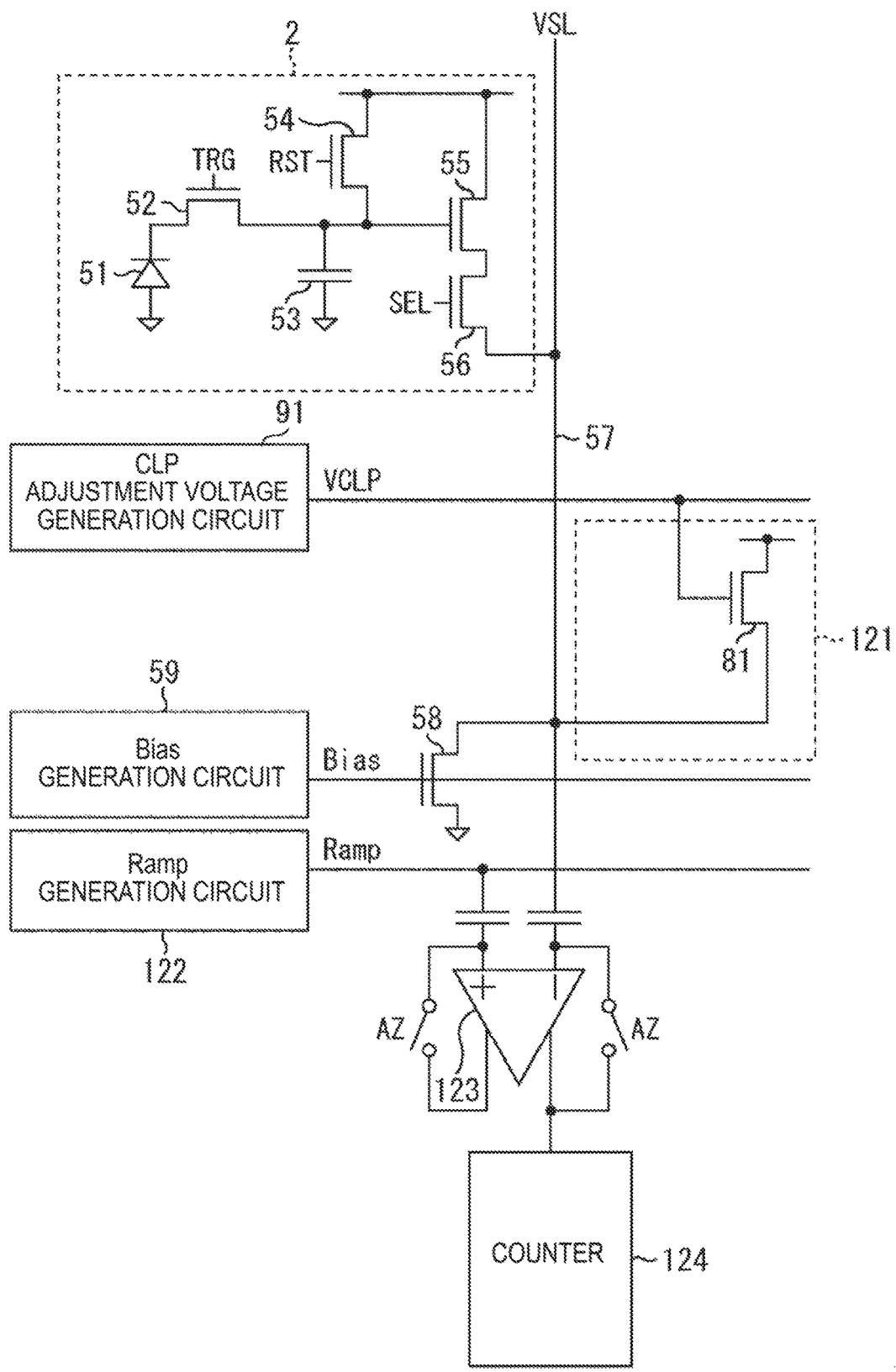
FIG. 7 illustrates a circuit configuration example of a conventional solid-state imaging device.

FIG. 7 illustrates a circuit configuration example of a conventional solid-state imaging device. The solid-state imaging device illustrated in FIG. 7 includes a single-slope AD conversion circuit.

In FIG. 7, a clipping circuit 121 includes the clipping transistor 81. The clipping transistor 81 generates a voltage to limit the voltage of the vertical signal line 57, in accordance with an adjustment voltage VCLP applied to its gate.

A Ramp generation circuit 122 generates a reference signal Ramp that exhibits a ramp waveform having a predetermined slope at a predetermined timing. The reference signal Ramp is input to one terminal of a comparator 123.

The comparator 123 compares the reference signal Ramp input to one terminal with a pixel signal input to the other terminal. The comparator 123 outputs a signal whose level is inverted in accordance with the magnitude relationship between the reference signal Ramp and the pixel signal to a counter 124.

The counter 124 executes up-count operation and down-count operation while switching between them. The counter 124 ends the up-count operation and the down-count operation in accordance with a timing at which the output of the comparator 123 is inverted. Count values obtained by the up-count operation and the down-count operation are output as digital data.

Note that the two terminals of the comparator 123 are each configured in a manner that offset is cancelled (auto zero) by an AZ switch.

Thus, the comparator 123 and the counter 124 constitute a single-slope AD conversion circuit.

Next, the operation of the solid-state imaging device illustrated in FIG. 7 will be described with reference to the timing chart of FIG. 8.

Figure 8:
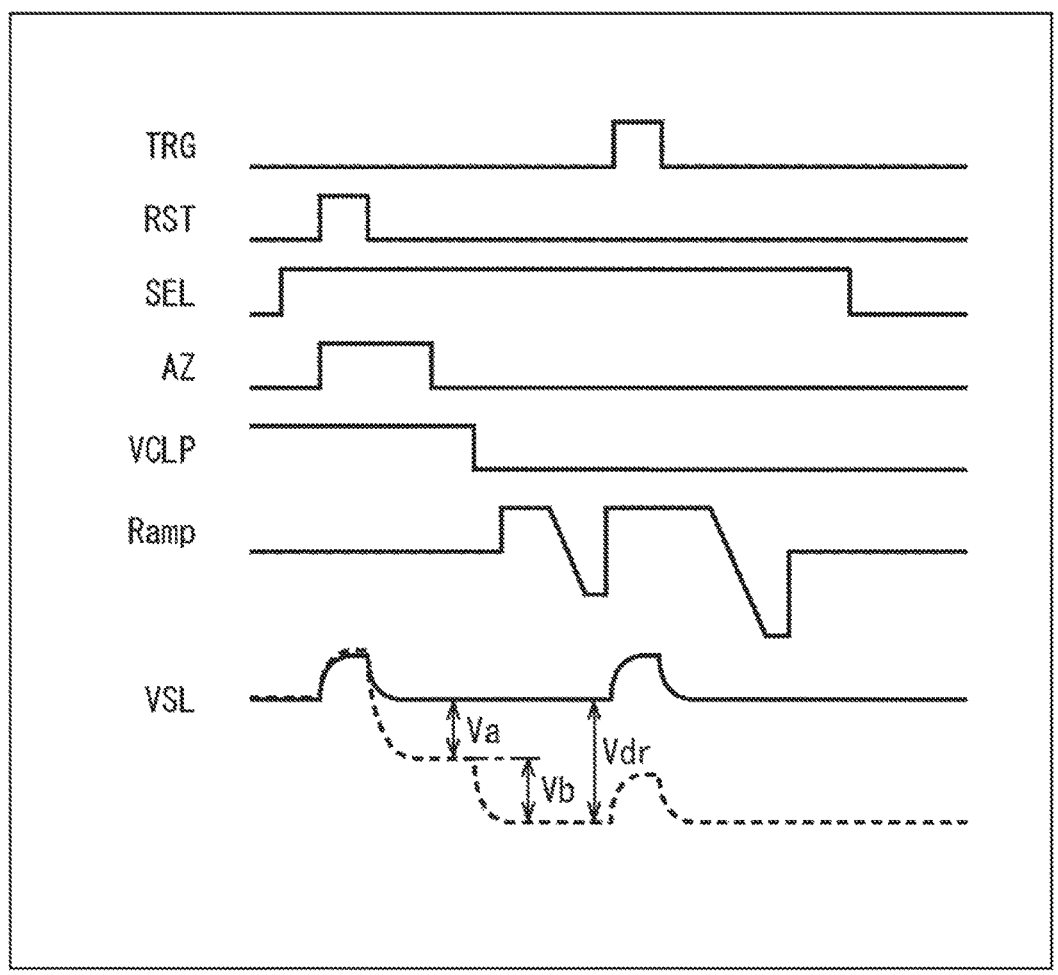
FIG. 8 is a timing chart illustrating the operation of a conventional solid-state imaging device.

In FIG. 8, TRG is a drive signal for driving the transfer transistor 52. RST is a drive signal for driving the reset transistor 54. SEL is a drive signal for driving the selection transistor 56. AZ is a drive signal for driving the AZ switches of the comparator 123. VCLP is an adjustment voltage generated by the CLP adjustment voltage generation circuit 91. Ramp is a reference signal generated by the Ramp generation circuit 122. VSL is the voltage of the vertical signal line 57, that is, a pixel signal.

Note that for VSL, the solid line indicates a pixel signal in a state (dark) where charge of the PD does not leak to the FD. The dotted line indicates a pixel signal in a state (light) where charge of the PD leaks to the FD and a sunspot occurs.

Although detailed description of signals will be omitted, the CLP adjustment voltage generation circuit 91 applies different adjustment voltages VCLP to the gate of the transistor 81 between in reading the reset level of the pixel 2 and in reading the signal level of the pixel 2. Such operation enables the reset level and the signal level to be clipped appropriately.

Here, attention is focused on a dark pixel signal and a light pixel signal (VSL).

In reset level reading, a voltage difference Va between the dark pixel signal and the light pixel signal exhibits a voltage difference equal to or more than a voltage difference that does not interfere with a normal pixel. Furthermore, a voltage difference Vb between in reset level reading and in signal level reading of the light pixel signal exhibits a voltage difference by which it can be determined that a sunspot has occurred.

In this case, a sum Vdr of the voltage difference Va and the voltage difference Vb is needed as a dynamic range of the AD conversion circuit.

Figure 9:
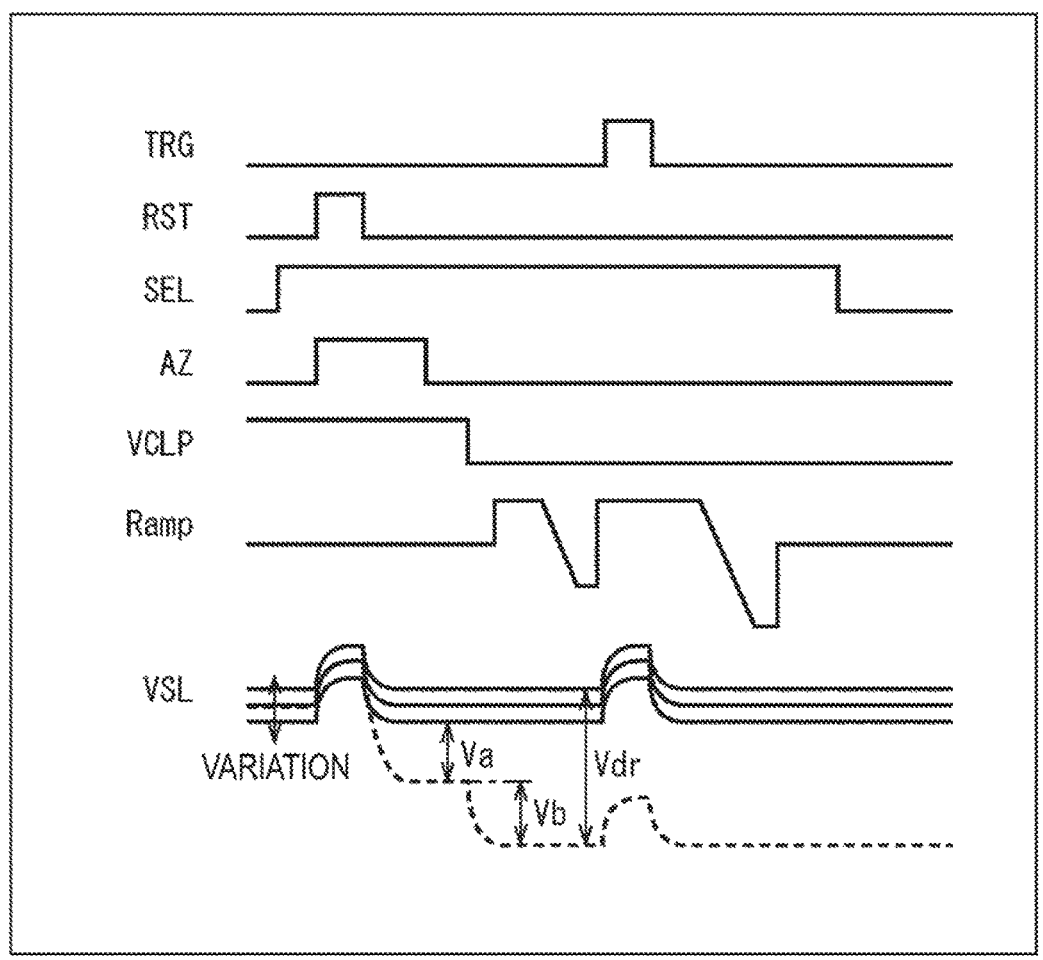
FIG. 9 is a timing chart illustrating the operation of a conventional solid-state imaging device.

However, in the case where there is variation (mainly variation in threshold voltage) between amplification transistors of pixels, the reset level of a pixel (dark) fluctuates as illustrated in FIG. 9. Therefore, the gate voltage of the transistor 81 of the clipping circuit 121 needs to be set to include some margin, in consideration of this variation. Accordingly, also the dynamic range Vdr of the AD conversion circuit needs to be set to include a margin similarly. That is, it is necessary to design the AD conversion circuit in consideration of at least a voltage corresponding to this margin.

Hence, in a solid-state imaging device of the present technology, a reset level is held and input to the gate of the clipping transistor 81.

First Embodiment of Present Technology

Figure 10:
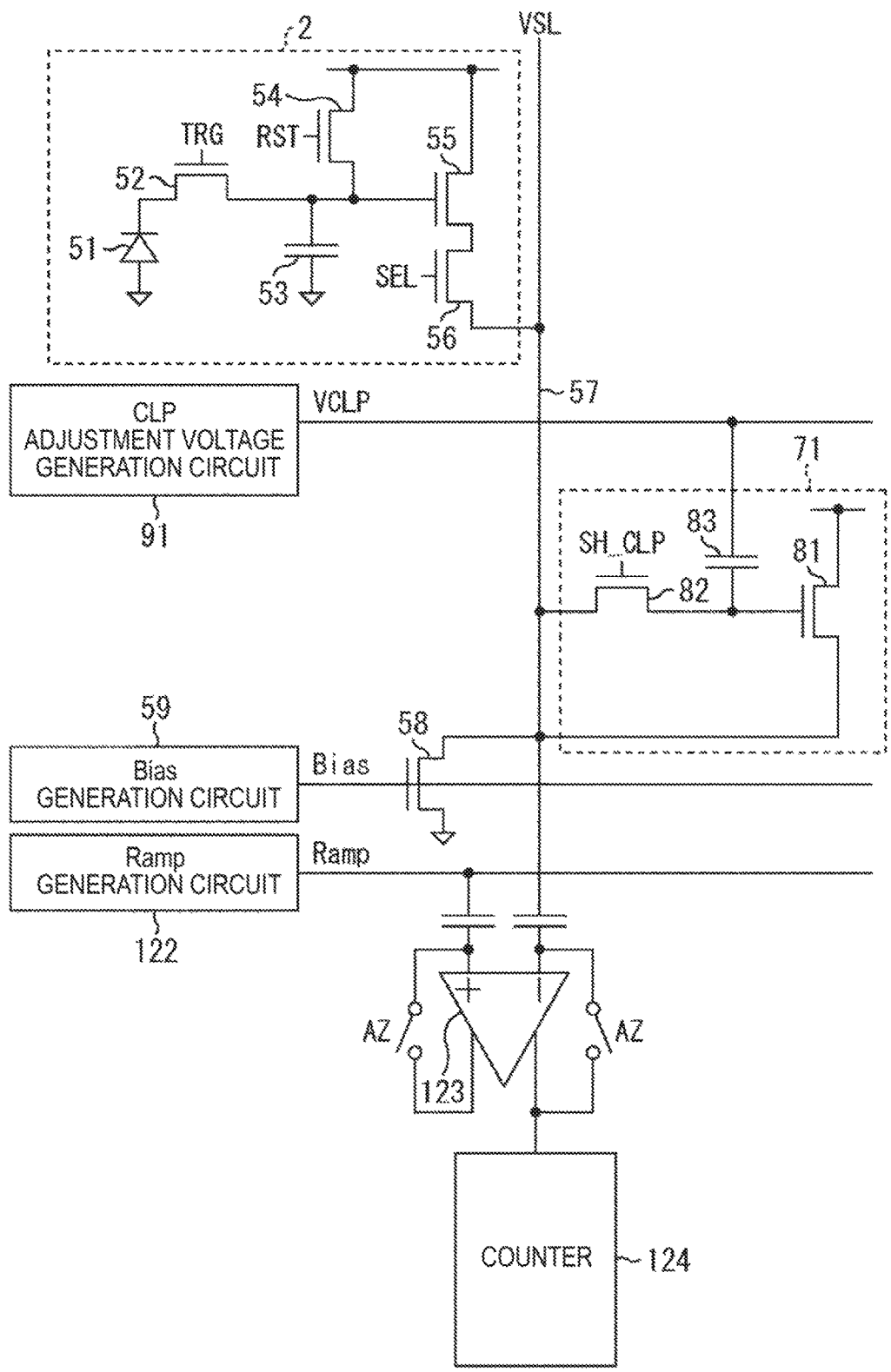
FIG. 10 illustrates a circuit configuration example of a solid-state imaging device of a first embodiment.

FIG. 10 illustrates a circuit configuration example of a solid-state imaging device of a first embodiment of the present technology. The solid-state imaging device illustrated in FIG. 10 includes a single-slope AD conversion circuit.

The solid-state imaging device illustrated in FIG. 10 includes, as a clipping circuit, the clipping circuit 71 described with reference to FIG. 3.

Figure 11:
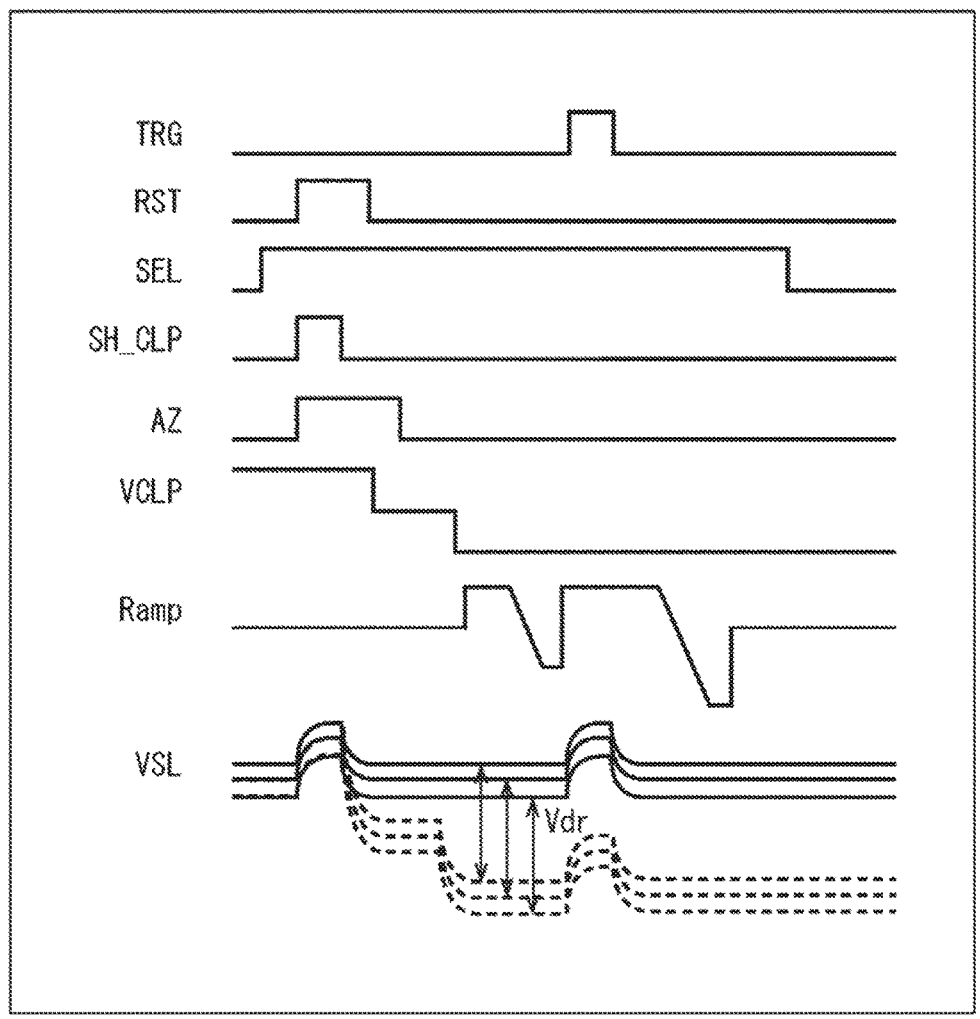
FIG. 11 is a timing chart illustrating the operation of the solid-state imaging device of the first embodiment.

With this configuration, as illustrated in FIG. 11, in the case where a reset level of a pixel (dark) fluctuates, a reset level including variation is held by the gate of the clipping transistor 81. That is, there is no need to provide a margin in consideration of this variation for the gate voltage of the transistor 81 of the clipping circuit 71. Accordingly, there also is no need to provide a margin similarly for the dynamic range Vdr of the AD conversion circuit. Consequently, the AD conversion circuit can be designed with the minimum dynamic range, without taking into consideration a voltage corresponding to this margin. As a result, the voltage of the AD conversion circuit can be reduced.

Second Embodiment of Present Technology

Figure 12:
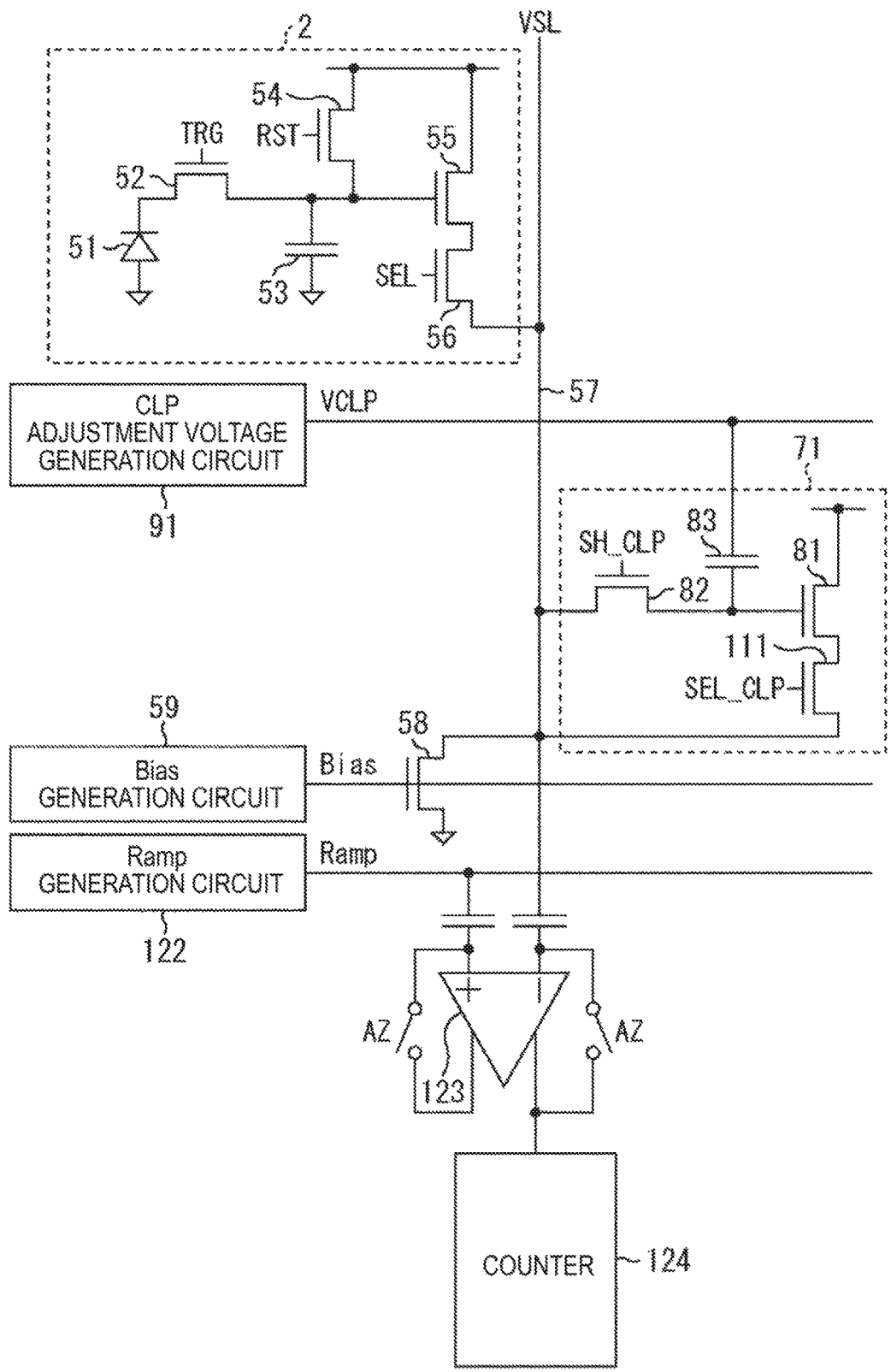
FIG. 12 illustrates a circuit configuration example of a solid-state imaging device of a second embodiment.

FIG. 12 illustrates a circuit configuration example of a solid-state imaging device of a second embodiment of the present technology. The solid-state imaging device illustrated in FIG. 12 also includes a single-slope AD conversion circuit.

The solid-state imaging device illustrated in FIG. 12 includes, as a clipping circuit, the clipping circuit 71 described with reference to FIG. 5.

Figure 13:
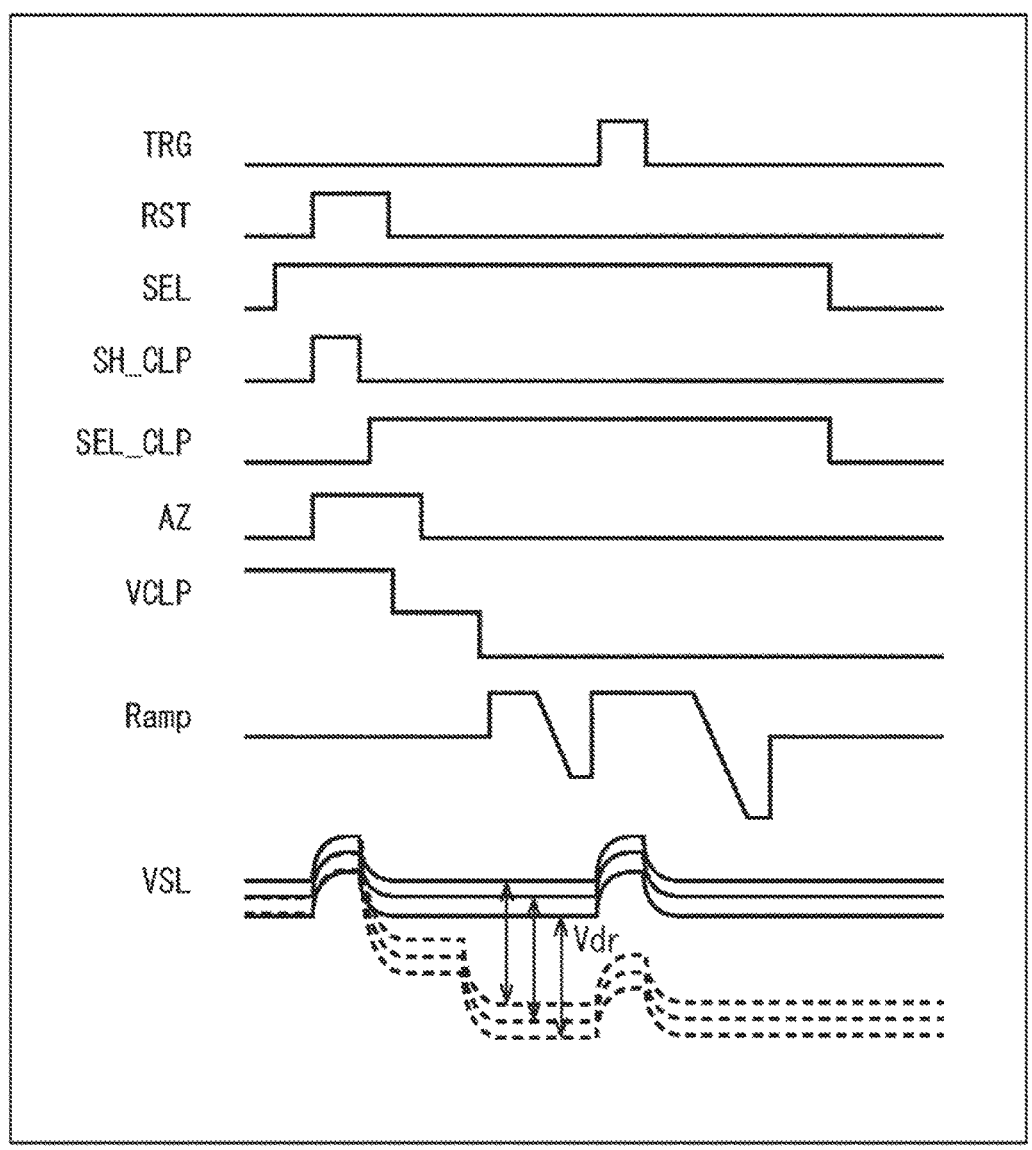
FIG. 13 is a timing chart illustrating the operation of the solid-state imaging device of the second embodiment.

With this configuration, as illustrated in FIG. 13, in the case where a reset level of a pixel (dark) fluctuates, a reset level including variation is held by the gate of the clipping transistor 81. That is, there is no need to provide a margin in consideration of this variation for the gate voltage of the transistor 81 of the clipping circuit 71. Accordingly, there also is no need to provide a margin similarly for the dynamic range Vdr of the AD conversion circuit. Consequently, the AD conversion circuit can be designed with the minimum dynamic range, without taking into consideration a voltage corresponding to this margin. As a result, the voltage of the AD conversion circuit can be reduced.

Note that in the operation in FIG. 13, the selector 111 may turn off the limitation on the voltage of the vertical signal line 57 using a voltage generated by the transistor 81, only in reset level reading or only in signal level reading. Furthermore, the limitation on the voltage of the vertical signal line 57 may be turned on/off for each pixel column as necessary.

Third Embodiment of Present Technology

Figure 14:
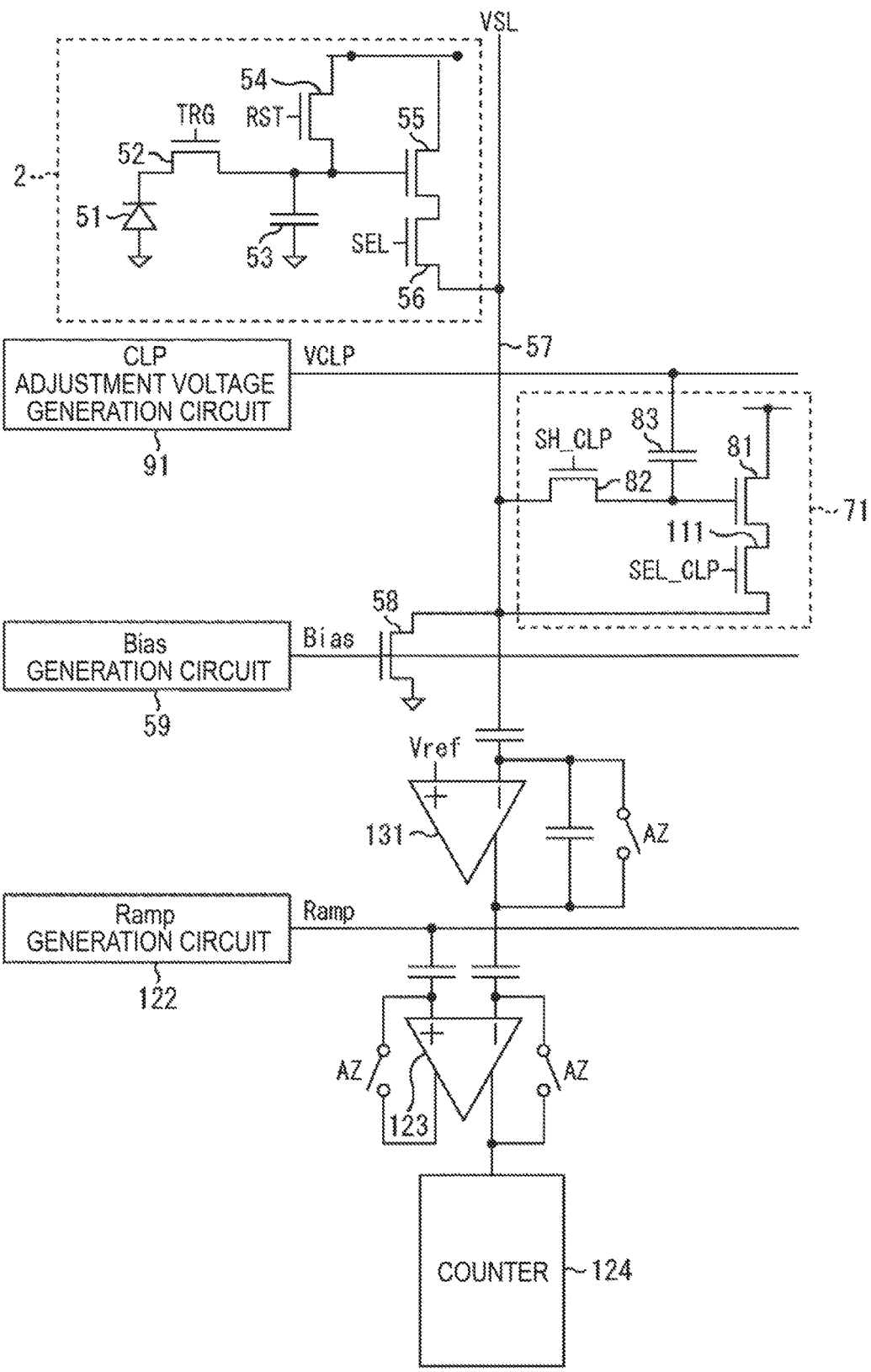
FIG. 14 illustrates a circuit configuration example of a solid-state imaging device of a third embodiment.

FIG. 14 illustrates a circuit configuration example of a solid-state imaging device of a third embodiment of the present technology.

The solid-state imaging device illustrated in FIG. 14 includes, in addition to the configuration in FIG. 12, a gain amplifier 131 preceding the comparator 123.

The gain amplifier 131 amplifies the voltage of the vertical signal line 57, that is, a pixel signal, and supplies the amplified voltage to the comparator 123.

Also in the configuration illustrated in FIG. 14, actions and effects equivalent to those of the configuration in FIG. 10 and the configuration in FIG. 12 can be obtained.

Fourth Embodiment of Present Technology

Figure 15:
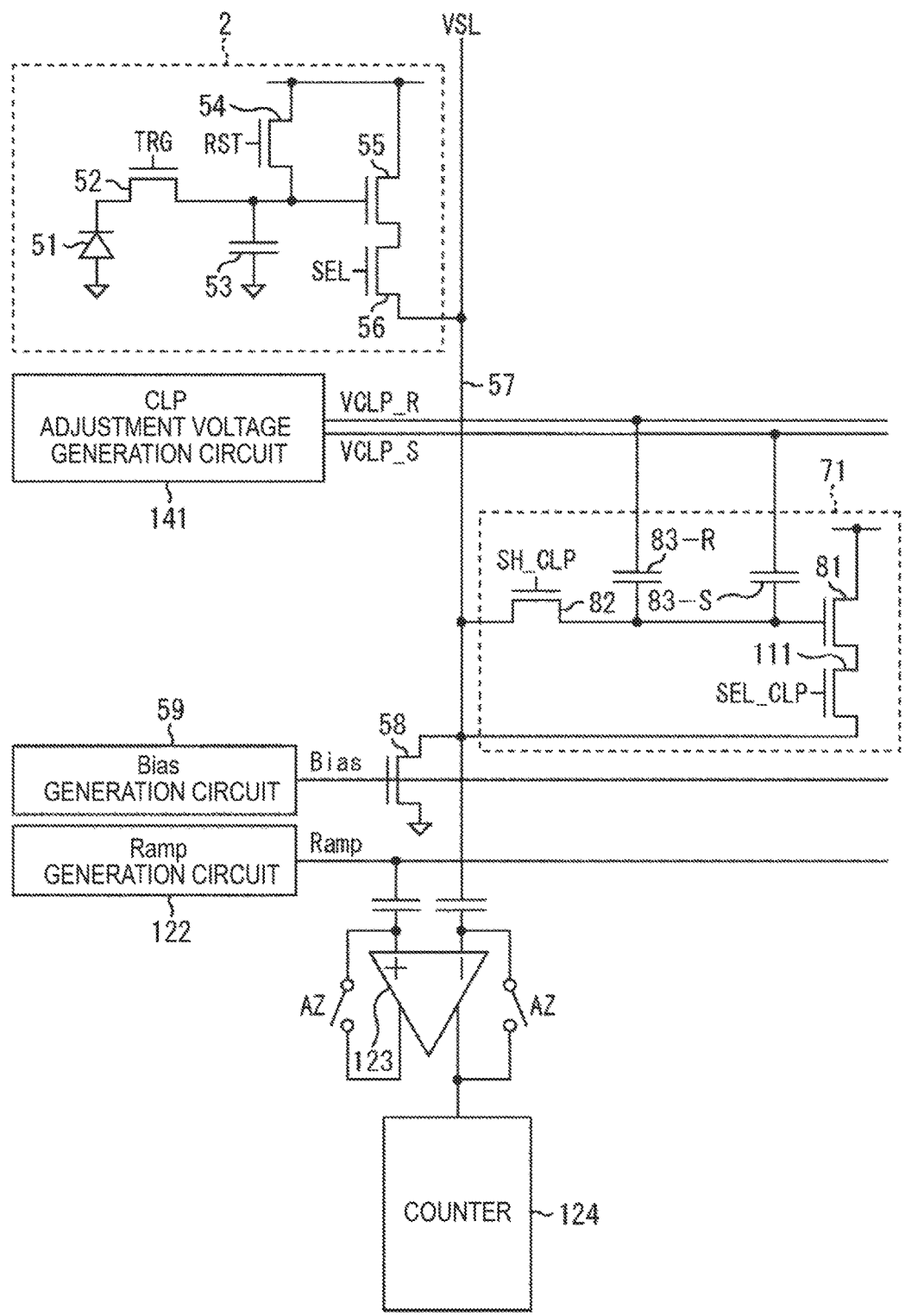
FIG. 15 illustrates a circuit configuration example of a solid-state imaging device of a fourth embodiment.

FIG. 15 illustrates a circuit configuration example of a solid-state imaging device of a fourth embodiment of the present technology.

The solid-state imaging device illustrated in FIG. 15 includes, in place of the capacitor 83 of the clipping circuit 71 in the configuration in FIG. 12, two capacitors 83-R and 83-S.

One electrode of each of the capacitors 83-R and 83-S is connected to the gate of the clipping transistor 81. The other electrode of each capacitor 83 is connected to a CLP adjustment voltage generation circuit 141.

The CLP adjustment voltage generation circuit 141 generates an adjustment voltage VCLP_R and applies it to the capacitor 83-R in reading the reset level of the pixel 2. In addition, the CLP adjustment voltage generation circuit 141 generates an adjustment voltage VCLP_S lower than the adjustment voltage VCLP_R and applies it to the capacitor 83-S in reading the signal level of the pixel 2.

Such operation enables the reset level and the signal level to be clipped appropriately.

Also in the configuration illustrated in FIG. 15, actions and effects equivalent to those of the configuration in FIG. 10 and the configuration in FIG. 12 can be obtained.

<Modification Examples of Structure of Solid-State Imaging Device>

Incidentally, as described with reference to FIG. 2, a solid-state imaging device of the present technology can have a stacked structure.

Figure 16:
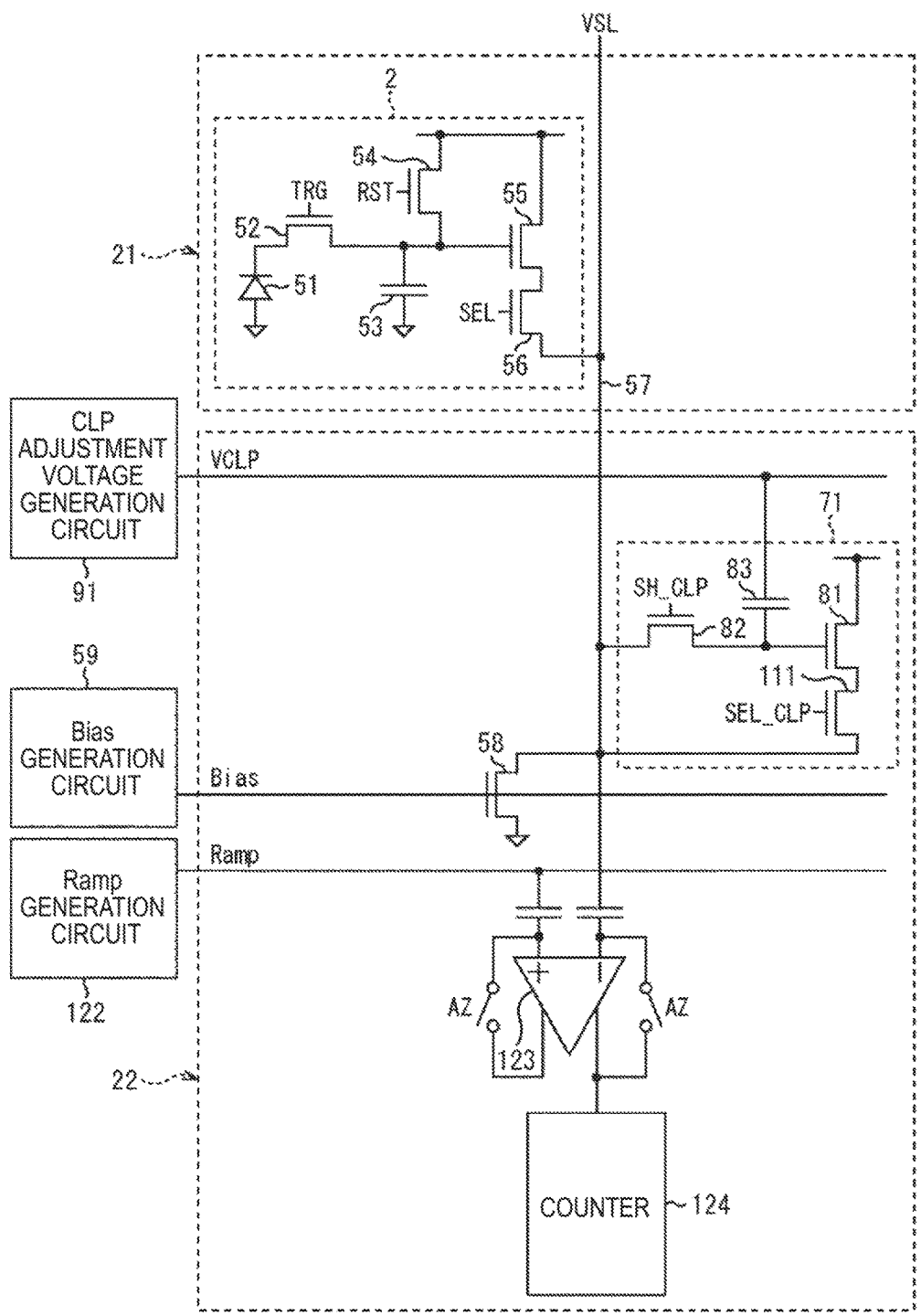
FIG. 16 illustrates a circuit modification example of a configuration of a solid-state imaging device of the present technology.

In this case, as illustrated in FIG. 16, the clipping circuit 71 may be provided not in the first semiconductor substrate 21 including the pixels 2 (the pixel area 23) but in the second semiconductor substrate 22 including the logic circuit 25.

Figure 17:
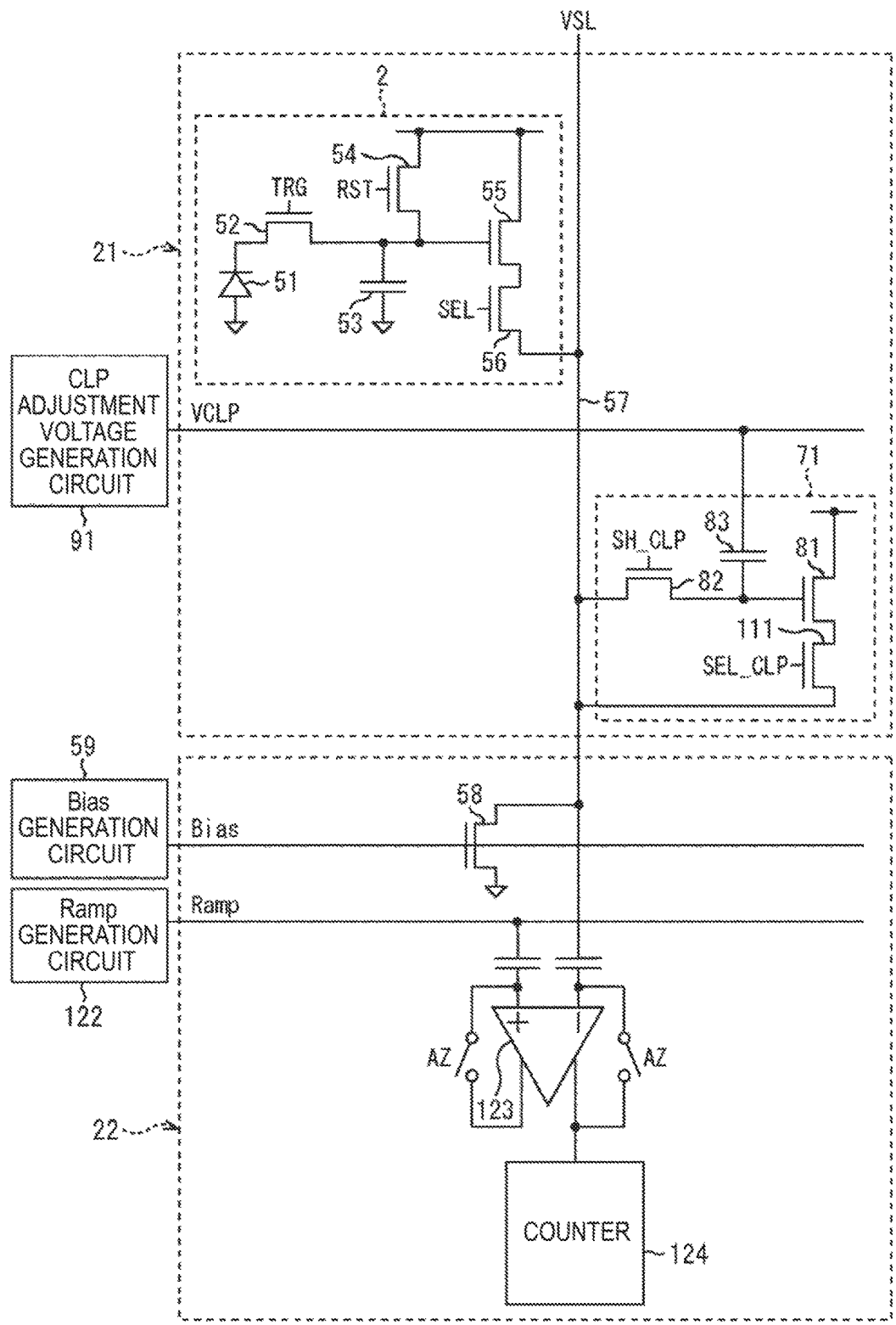
FIG. 17 illustrates a circuit modification example of a configuration of a solid-state imaging device of the present technology.

Conversely, as illustrated in FIG. 17, the clipping circuit 71 may be provided not in the second semiconductor substrate 22 including the logic circuit 25 but in the first semiconductor substrate 21 including the pixels 2 (the pixel area 23).

Furthermore, in the circuit configurations of the solid-state imaging devices described above, the clipping circuit may be provided at any position.

Figure 18:
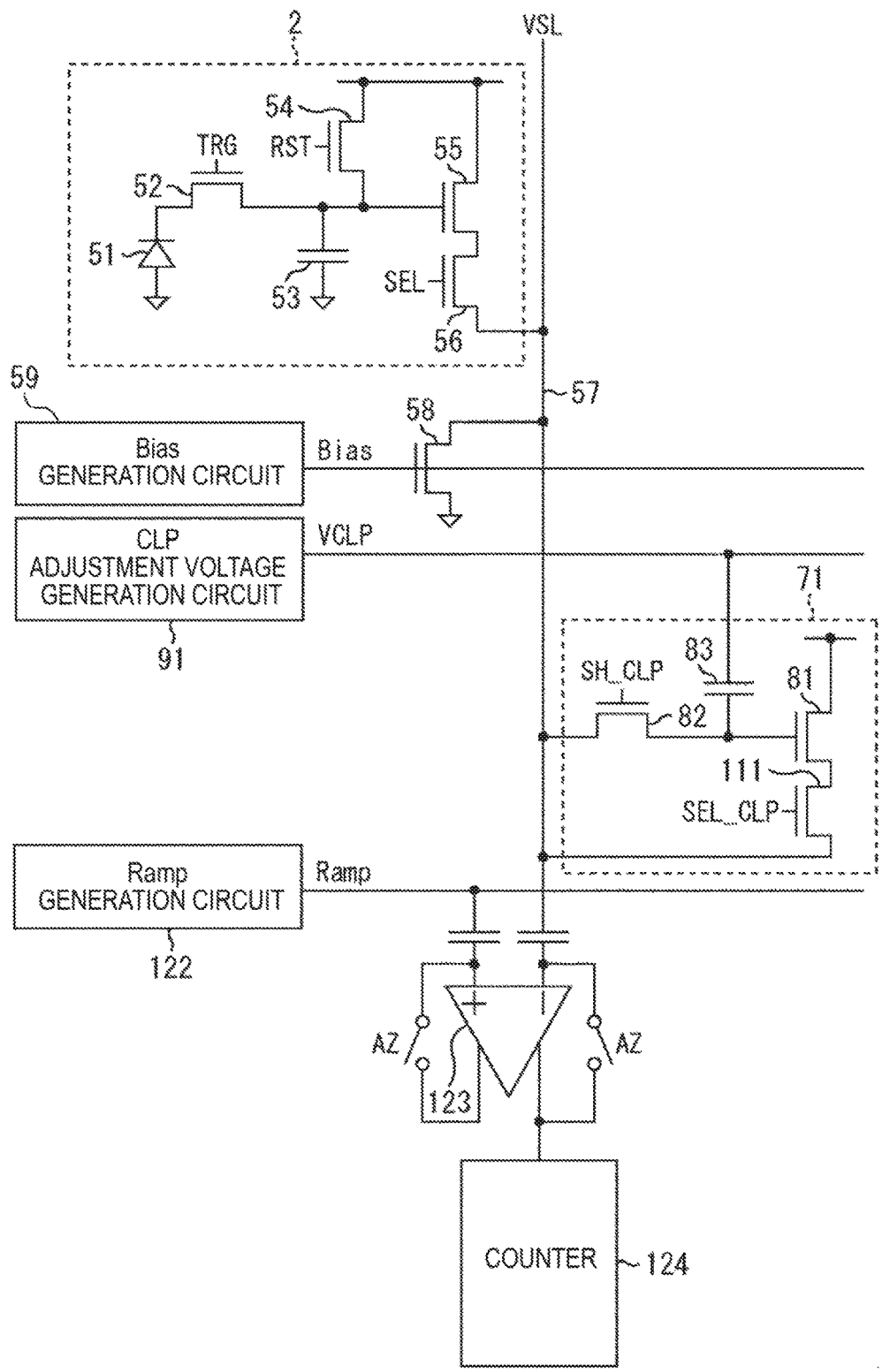
FIG. 18 illustrates a circuit modification example of a configuration of a solid-state imaging device of the present technology.

For example, as illustrated in FIG. 18, the clipping circuit 71 may be provided to follow the load MOS transistor 58.

The present technology is not limited to application to solid-state imaging devices, and is also applicable to imaging devices. Here, imaging devices refer to a camera system (e.g., a digital still camera and a digital video camera) and an electronic device with an imaging function (e.g., a mobile phone). Note that a module form mounted on an electronic device, that is, a camera module, is taken as an imaging device in some cases.

<Configuration Example of Electronic Device>

Here, a configuration example of an electronic device to which the present technology is applied will be described, with reference to FIG. 19.

Figure 19:
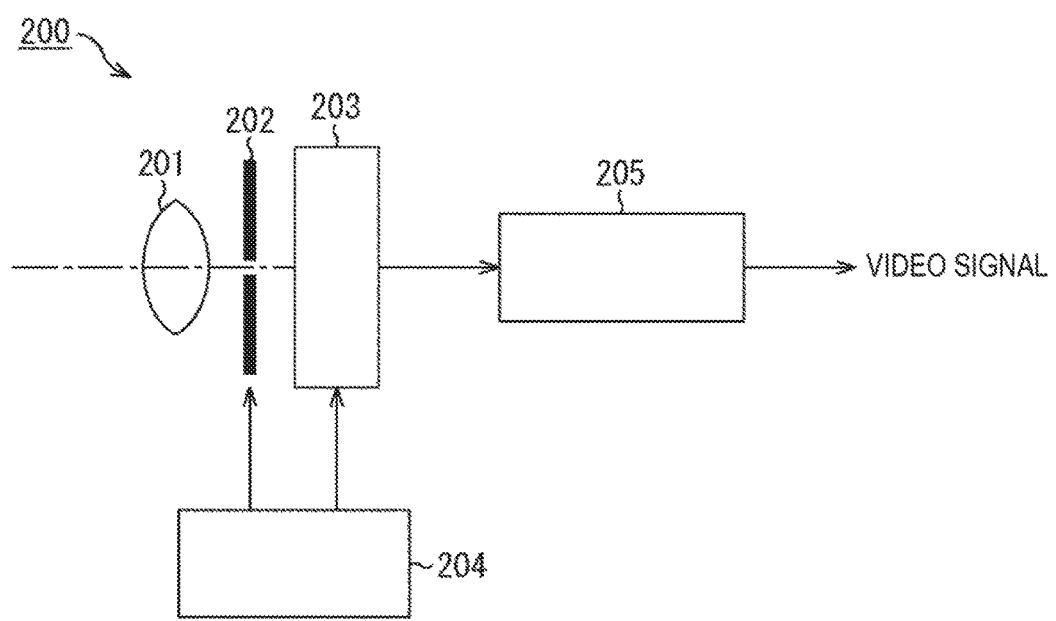
FIG. 19 is a block diagram illustrating a configuration example of an electronic device of the present technology.

An electronic device 200 illustrated in FIG. 19 includes an optical lens 201, a shutter device 202, a solid-state imaging device 203, a drive circuit 204, and a signal processing circuit 205. FIG. 19 illustrates an embodiment in which the solid-state imaging device 1 of the present technology described above is provided in an electronic device (digital still camera) as the solid-state imaging device 203.

The optical lens 201 causes image light (incident light) from an object to form an image on an imaging surface of the solid-state imaging device 203. Thus, signal charge is accumulated in the solid-state imaging device 203 for a certain period. The shutter device 202 controls a light irradiation period and a light blocking period for the solid-state imaging device 203.

The drive circuit 204 supplies drive signals to the shutter device 202 and the solid-state imaging device 203. The drive signal supplied to the shutter device 202 is a signal for controlling shutter operation of the shutter device 202. The drive signal supplied to the solid-state imaging device 203 is a signal for controlling signal transfer operation of the solid-state imaging device 203. The solid-state imaging device 203 performs signal transfer in accordance with the drive signal (timing signal) supplied from the drive circuit 204. The signal processing circuit 205 performs various signal processing on signals output from the solid-state imaging device 203. Video signals that have undergone signal processing are stored in a storage medium, such as a memory, or output to a monitor.

In the electronic device 200 of the present embodiment, the voltage of an AD conversion circuit can be reduced in the solid-state imaging device 203; thus, as a result, an electronic device with low power consumption can be provided.

<Usage Examples of Image Sensor>

Lastly, usage examples of the image sensor to which the present technology is applied will be described.

Figure 20:
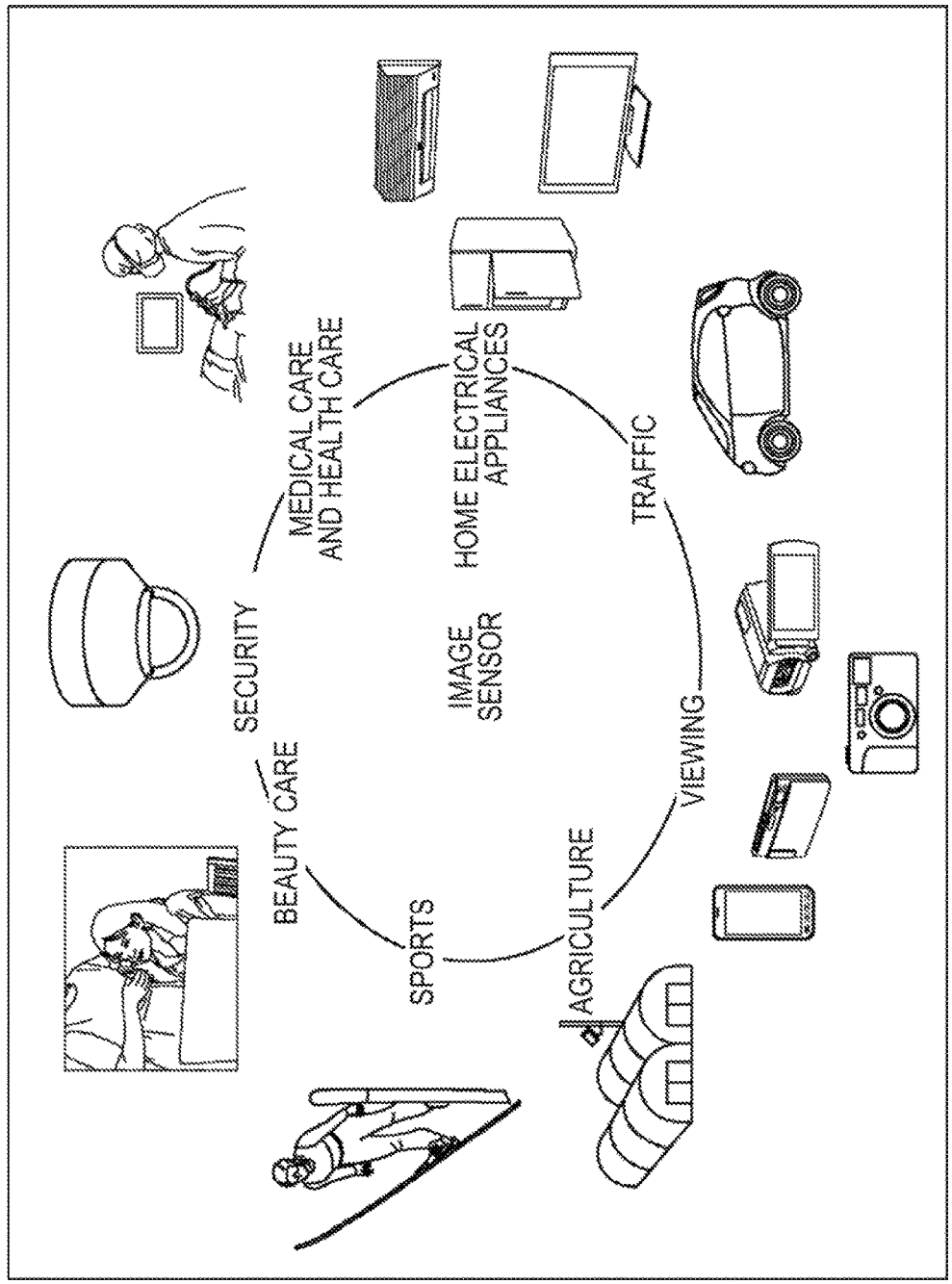
FIG. 20 illustrates usage examples of an image sensor.

FIG. 20 illustrates the usage examples of the above-described image sensor.

The above-described image sensor can be used for, for example, various cases in which light such as visible light, infrared light, ultraviolet light, or X-rays is detected as follows.

Devices that take images used for viewing, such as a digital camera and a portable appliance with a camera function.

Devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.

Devices used for home electrical appliances, such as a TV, a refrigerator, and an air conditioner, to takes images of a gesture of a user and perform appliance operation in accordance with the gesture.

Devices used for medical care and health care, such as an endoscope and a device that performs angiography by reception of infrared light.

Devices used for security, such as a monitoring camera for crime prevention and a camera for personal authentication.

Devices used for beauty care, such as skin measurement equipment that takes images of the skin and a microscope that takes images of the scalp.

Devices used for sports, such as an action camera and a wearable camera for sports and the like.

Devices used for agriculture, such as a camera for monitoring the condition of the field and crops.

In addition, embodiments of the present disclosure are not limited to the above-described embodiments, and various alterations may occur insofar as they are within the scope of the present disclosure.

Additionally, the present technology may also be configured as below.

(1)

A solid-state imaging device including:
 a plurality of pixels;
 a vertical signal line configured to output a pixel signal of the pixel; and
 a clipping circuit configured to limit a voltage of the vertical signal line to a predetermined voltage,
 in which the clipping circuit includes
 a transistor configured to generate the predetermined voltage in accordance with a voltage of a gate, and
 a sample holding circuit configured to hold a reset level of the pixel that is output to the vertical signal line, and input the reset level to the gate of the transistor.

(2)

The solid-state imaging device according to (1),
 in which the clipping circuit further includes a capacitor having one electrode connected to the gate of the transistor, and
 a voltage generation circuit configured to generate a plurality of different voltages is connected to the other electrode of the capacitor.

(3)

The solid-state imaging device according to (2),
 in which the voltage generation circuit applies different voltages to the capacitor between in reading the reset level of the pixel and in reading a signal level of the pixel.

(4)

The solid-state imaging device according to (2),
 the voltage generation circuit applies a first voltage to one capacitor in reading the reset level of the pixel, and applies a second voltage to another capacitor in reading a signal level of the pixel.

(5)

The solid-state imaging device according to any one of (1) to (4),
 in which the clipping circuit further includes a selector configured to turn on/off a limitation on the voltage of the vertical signal line using the predetermined voltage generated by the transistor.

(6)

An electronic device including
 a solid-state imaging device including
 a plurality of pixels,
 a vertical signal line configured to output a pixel signal of the pixel, and
 a clipping circuit configured to limit a voltage of the vertical signal line to a predetermined voltage,
 in which the clipping circuit includes
 a transistor configured to generate the predetermined voltage in accordance with a voltage of a gate, and
 a sample holding circuit configured to hold a reset level of the pixel that is output to the vertical signal line, and input the reset level to the gate of the transistor.

REFERENCE SIGNS LIST 1 solid-state imaging device
2 pixel
57 vertical signal line
71 clipping circuit
81 clipping transistor
82 sample holding circuit
83 capacitor
91 CLP adjustment voltage generation circuit
111 selector
200 electronic device
203 solid-state imaging device

The invention claimed is:

1. A solid-state imaging device, comprising:
 a plurality of pixels;
 a vertical signal line configured to output a pixel signal of
  a pixel of the plurality of pixels;
 a clipping circuit configured to limit a first voltage of the
  vertical signal line to a second voltage,
 wherein the clipping circuit includes:
  a transistor configured to generate the second voltage
   based on a third voltage of a gate of the transistor, a sample holding circuit configured to:
    hold a reset level of the pixel that is output to the vertical signal line, and
    input the reset level to the gate of the transistor, and
a plurality of capacitors; and
a voltage generation circuit configured to:
    apply a fourth voltage to a first capacitor of the plurality of capacitors to read the reset level of the pixel, and
    apply a fifth voltage to a second capacitor of the plurality of capacitors to read a signal level of the pixel.

2. The solid-state imaging device according to claim 1,
wherein a third capacitor of the plurality of capacitors comprises the first electrode connected to the gate of the transistor, and
wherein the voltage generation circuit is connected to a second electrode of the third capacitor.

3. The solid-state imaging device according to claim 1,
wherein the clipping circuit further includes a selector configured to one of turn on or turn off a limitation on the first voltage of the vertical signal line based on the second voltage generated by the transistor.

4. An electronic device, comprising
a solid-state imaging device, including:
    a plurality of pixels,
    a vertical signal line configured to output a pixel signal of a pixel of the plurality of pixels, and
    a clipping circuit configured to limit a first voltage of the vertical signal line to a second voltage,
    wherein the clipping circuit includes:
        a transistor configured to generate the second voltage based on a third voltage of a gate of the transistor,
        a sample holding circuit configured to:
            hold a reset level of the pixel that is output to the vertical signal line, and
            input the reset level to the gate of the transistor, and
        a plurality of capacitors; and
    a voltage generation circuit configured to:
        apply a fourth voltage to a first capacitor of the plurality of capacitors to read the reset level of the pixel, and
        apply a fifth voltage to a second capacitor of the plurality of capacitors to read a signal level of the pixel.

* * * * *